United States Patent
Vermani et al.

(10) Patent No.: US 9,398,123 B2
(45) Date of Patent: Jul. 19, 2016

(54) SYSTEMS AND METHODS FOR AGGREGATION OF PHYSICAL PROTOCOL DATA UNITS ON A WIRELESS NETWORK

(71) Applicant: QUALCOMM Incorporated, San Diego, CA (US)

(72) Inventors: Sameer Vermani, San Diego, CA (US); Bin Tian, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/253,731

(22) Filed: Apr. 15, 2014

(65) Prior Publication Data

US 2014/0328249 A1 Nov. 6, 2014

Related U.S. Application Data

(60) Provisional application No. 61/819,091, filed on May 3, 2013.

(51) Int. Cl.
| | |
|---|---|
| *H04W 72/04* | (2009.01) |
| *H04L 29/08* | (2006.01) |
| *H04W 28/06* | (2009.01) |
| *H04L 5/00* | (2006.01) |
| *H04L 27/26* | (2006.01) |

(52) U.S. Cl.
CPC ........... *H04L 69/323* (2013.01); *H04W 28/065* (2013.01); *H04L 5/0007* (2013.01); *H04L 27/2613* (2013.01)

(58) Field of Classification Search
CPC . H04L 69/323; H04L 5/0007; H04L 27/2613; H04W 28/065
See application file for complete search history.

(56) References Cited

U.S. PATENT DOCUMENTS

| | | | | |
|---|---|---|---|---|
| 2005/0237956 A1* | 10/2005 | Kuperschmidt | ....... | H04L 1/0041 370/310 |
| 2006/0018268 A1* | 1/2006 | Kakani | ................. | H04W 28/06 370/278 |
| 2006/0018302 A1* | 1/2006 | Ivaldi | ..................... | H04L 12/28 370/351 |
| 2006/0056443 A1* | 3/2006 | Tao | ........................ | H04W 28/06 370/462 |
| 2006/0215774 A1* | 9/2006 | Shor | .................... | H04J 11/0023 375/260 |
| 2007/0014273 A1* | 1/2007 | Kuperschmidt | ....... | H04B 1/719 370/347 |
| 2010/0046367 A1 | 2/2010 | Vermani et al. | | |
| 2010/0054215 A1* | 3/2010 | Stahl | ..................... | H04W 48/08 370/337 |
| 2010/0091759 A1* | 4/2010 | Stahl | .................. | H04L 12/2832 370/347 |

(Continued)

OTHER PUBLICATIONS

International Search Report and Written Opinion—PCT/US2014/034373—ISA/EPO—Aug. 21, 2014.

*Primary Examiner* — Jay P Patel
(74) *Attorney, Agent, or Firm* — Knobbe Martens Olson & Bear LLP

(57) ABSTRACT

Systems and methods for aggregation of multiple physical protocol data units are disclosed. In one aspect, a method of transmitting a physical layer packet to a plurality of wireless devices is disclosed. The method includes generating a physical layer packet, the packet including a plurality of payloads, wherein at least one of the payloads comprises first data addressed to a first device and second data addressed to a second device, and wherein each payload is preceded by at least a signal field in the physical layer packet, and transmitting the physical layer packet.

30 Claims, 9 Drawing Sheets

(56) References Cited

U.S. PATENT DOCUMENTS

| | | | |
|---|---|---|---|
| 2010/0229015 A1* | 9/2010 | Hebron | H04L 12/10 713/323 |
| 2011/0002319 A1* | 1/2011 | Husen | H04W 72/042 370/338 |
| 2011/0110348 A1 | 5/2011 | Lee et al. | |
| 2011/0142020 A1* | 6/2011 | Kang | H04L 5/0048 370/338 |
| 2011/0199971 A1 | 8/2011 | Kim et al. | |
| 2012/0127940 A1* | 5/2012 | Lee | H04L 5/0023 370/329 |
| 2012/0207071 A1* | 8/2012 | Zhu | H04B 7/0452 370/311 |
| 2012/0307147 A1* | 12/2012 | Kondareddy | H04W 72/10 348/515 |
| 2012/0320956 A1* | 12/2012 | Sorrentino | H04L 5/0023 375/219 |
| 2014/0140312 A1* | 5/2014 | Lee | H04B 7/0452 370/329 |
| 2014/0204890 A1* | 7/2014 | Kudo | H04B 7/0452 370/329 |
| 2015/0237613 A1* | 8/2015 | Lee | H04W 72/0406 370/338 |

* cited by examiner

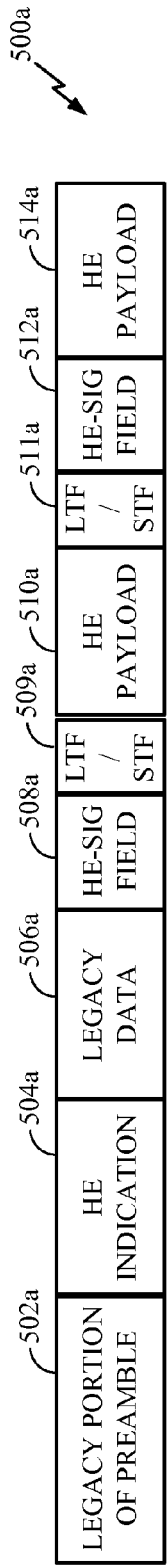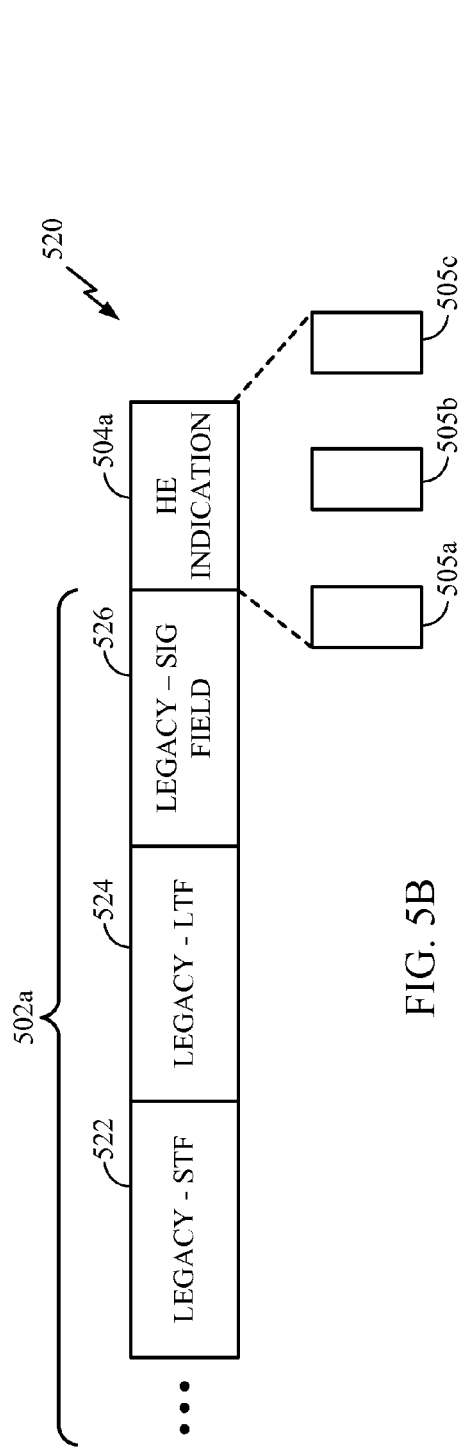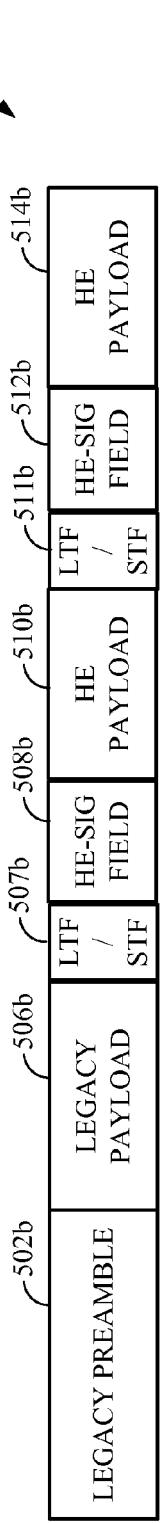
FIG. 5A
FIG. 5B
FIG. 5C

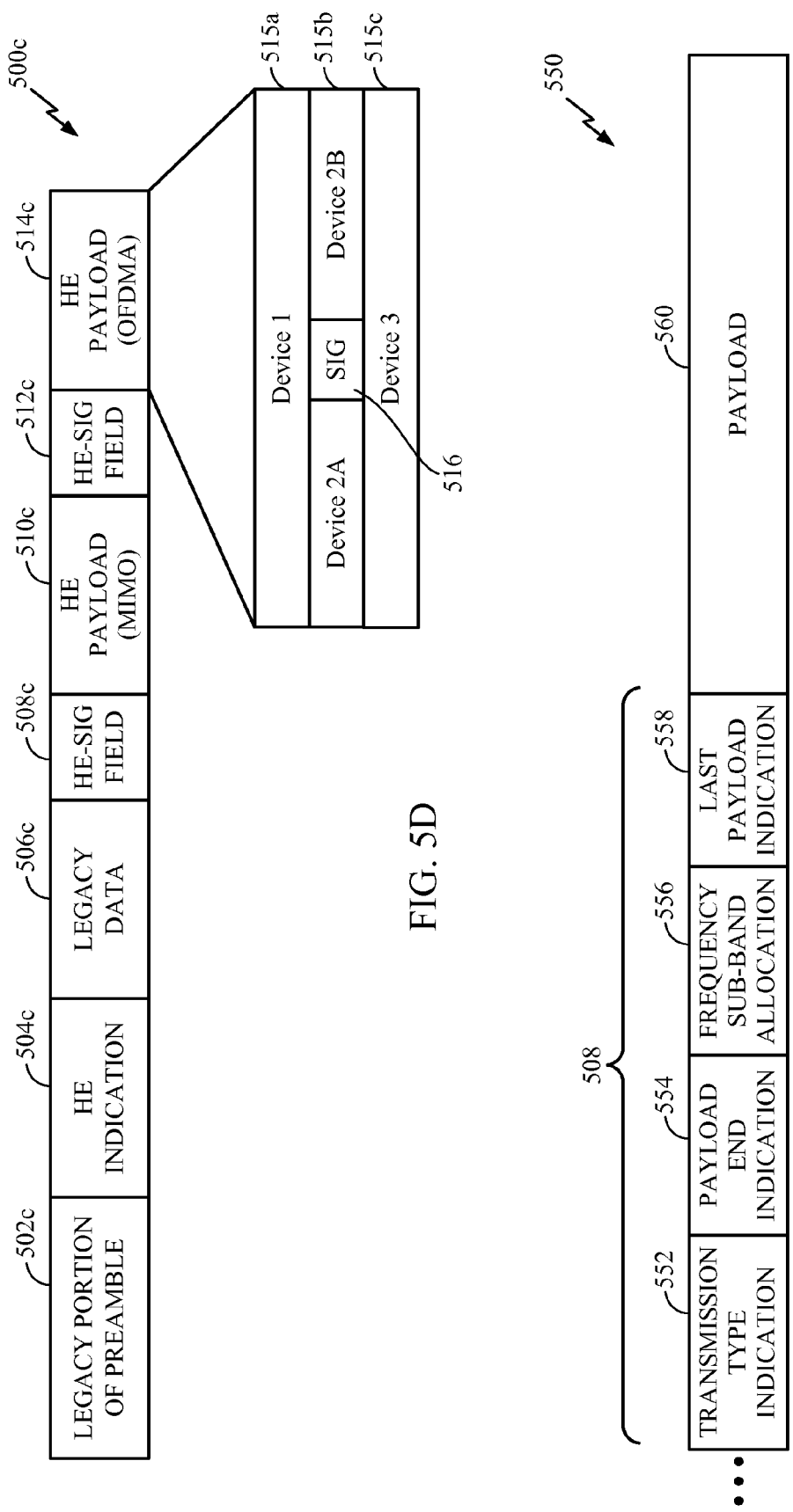

SYSTEMS AND METHODS FOR AGGREGATION OF PHYSICAL PROTOCOL DATA UNITS ON A WIRELESS NETWORK

CROSS-REFERENCE TO RELATED APPLICATIONS

This application claims the benefit of U.S. Provisional Application 61/819,091, filed May 3, 2013, and entitled "SYSTEMS AND METHODS FOR AGGREGATION OF PHYSICAL PROTOCOL DATA UNITS ON A WIRELESS NETWORK," and assigned to the assignee hereof. The disclosure of this prior application is considered part of this application, and is hereby incorporated by reference in its entirety.

BACKGROUND

1. Field

The present application relates generally to wireless communications, and more specifically to systems, methods, and devices for the aggregation of PPDUs within a single wireless packet.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated is desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect disclosed is a method of or apparatus for transmitting a physical layer packet to a plurality of wireless devices. Another aspect is a computer readable storage medium storing instructions that perform the method. The method includes generating a physical layer packet to include a plurality of payloads, wherein at least one of the payloads comprises first data addressed to a first device and second data addressed to a second device, and wherein each payload is preceded by at least a signal field in the physical layer packet; and transmitting the physical layer packet. Some aspects of the method also include generating the physical layer packet to separate the payloads in the physical layer packet by one or more of a short training field, a long training field, and a signal field. Some aspects of the method include generating the physical layer packet to indicate a transmission schedule associated with the plurality of payloads. Some aspects of the method include indicating the transmission schedule in a duration field of a signal field preceding the plurality of payloads.

In some aspects, the method also includes generating the packet to include a signal field preceding a first payload of the plurality of payloads to indicate whether the first payload is transmitted using one of single user transmission, multi-user multiple input multiple output transmission (MU-MIMO) transmission or orthogonal frequency-division multiple access (OFDMA) transmission. In some aspects, the method also includes generating the first payload to include a sub band comprising third data and fourth data, wherein third data and fourth data are addressed to different devices; and transmitting the first payload using OFDMA.

In some aspects, the transmission of third data and fourth data are separated in time within the sub-band by a signature. In some aspects, the method also includes ordering the transmission of third data and fourth data based on an modulation and coding scheme (MCS) of a destination device for third data and an modulation and coding scheme (MCS) for a destination device of fourth data.

Another aspect disclosed is a method or apparatus for receiving a high efficiency physical data packet from a wireless network. Another aspect is a computer readable storage medium storing instructions that when executed cause a processor to perform the method. The method includes receiving a physical layer packet from a wireless network, decoding the packet to identify a first signal field, decoding the first signal field to identify a first payload from the packet, the first payload comprising first data addressed to a first device and second data addressed to a second device, decoding the packet to identify a second signal field; and decoding the second signal field to identify a second payload, the second payload comprising third data addressed to at least one of the first device, the second device, or a third device.

In some aspects, the method also includes identifying a signature that separates the first and second payloads in the physical layer packet, wherein the signature is one or more of a short training field, a long training field, and a signal field. In some aspects, the method also includes decoding the physical layer packet to determine a transmission schedule associated with the first and second payloads. In some aspects, the method also includes decoding a duration field in a corresponding signal field to determine the transmission schedule for a payload. In some aspects, the method also includes decoding a signal field preceding a payload to determine whether the payload is received via single user transmission, multi-user multiple input multiple output transmission (MU- MIMO) transmission or orthogonal frequency-division multiple access (OFDMA) transmission. In some aspects of the method, the first payload is received via OFDMA, and wherein a sub-band of the OFDMA payload comprises third data and fourth data, wherein third data and fourth data are addressed to different devices. In some aspects of the method, the method includes decoding data in the sub-band based on a group identifier. In some aspects of the method, the method also includes decoding a signal field preceding the payload to determine an indication of a number of frequency sub-bands in the payload that comprise data transmitted to the at least two different devices.

BRIEF DESCRIPTION OF THE DRAWINGS

FIG. 5A illustrates an exemplary structure of a physical layer packet which may be used in a high efficiency WiFi implementation.

FIG. 5B shows a portion of high efficiency packet.

FIG. 5C shows another implementation of a high efficiency packet.

FIG. 5D shows an exemplary implementation of a high efficiency packet.

FIG. 5E shows an exemplary implementation of a high efficiency payload and a high efficiency signal field.

DETAILED DESCRIPTION

Figure 1:
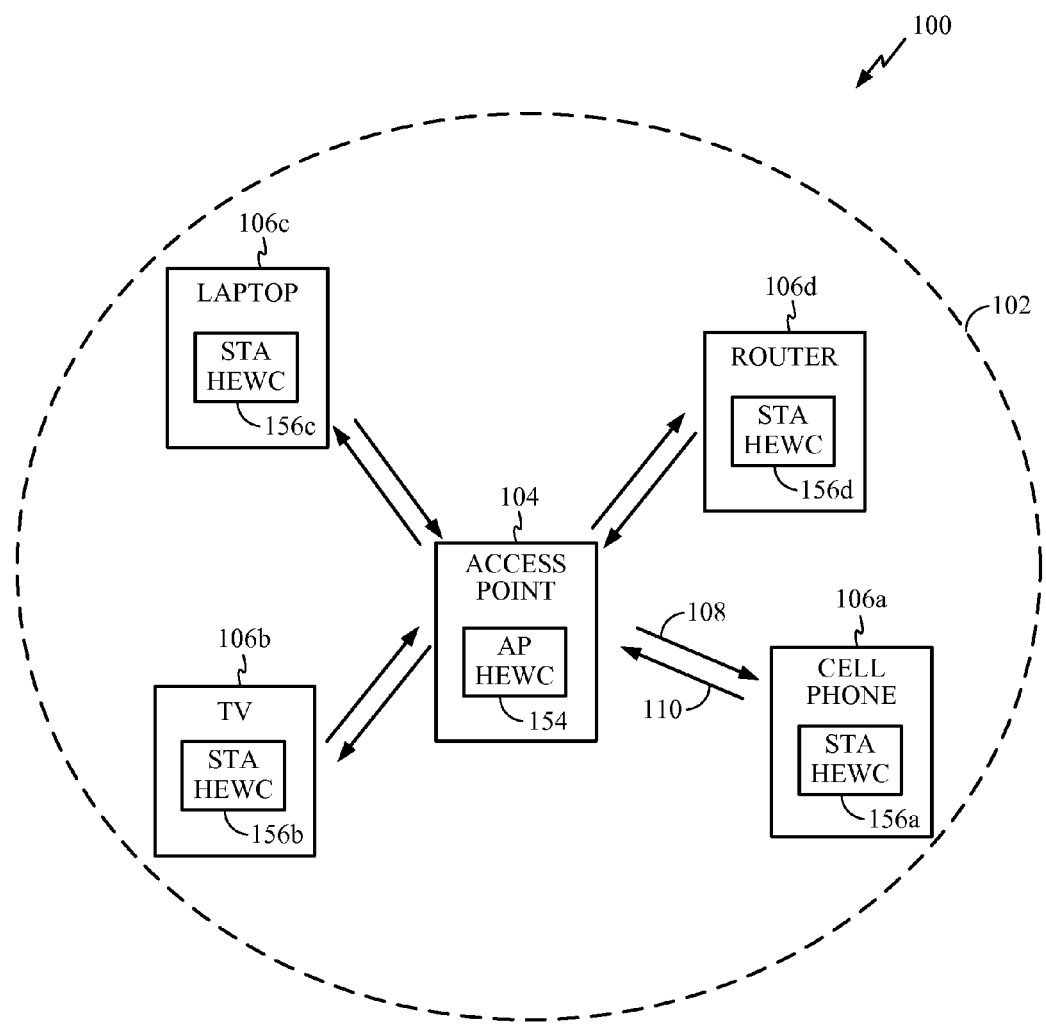
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106a-d.

A variety of processes and methods may be used for transmissions in the wireless communication system 100 between the AP 104 and the STAs 106a-d. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106a-d in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to at least FIGS. 2B, 3, and 4.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of the STA HEWC 156 is described in greater detail below with respect to at least FIGS. 2B, 3, and 4.

Figure 2A:
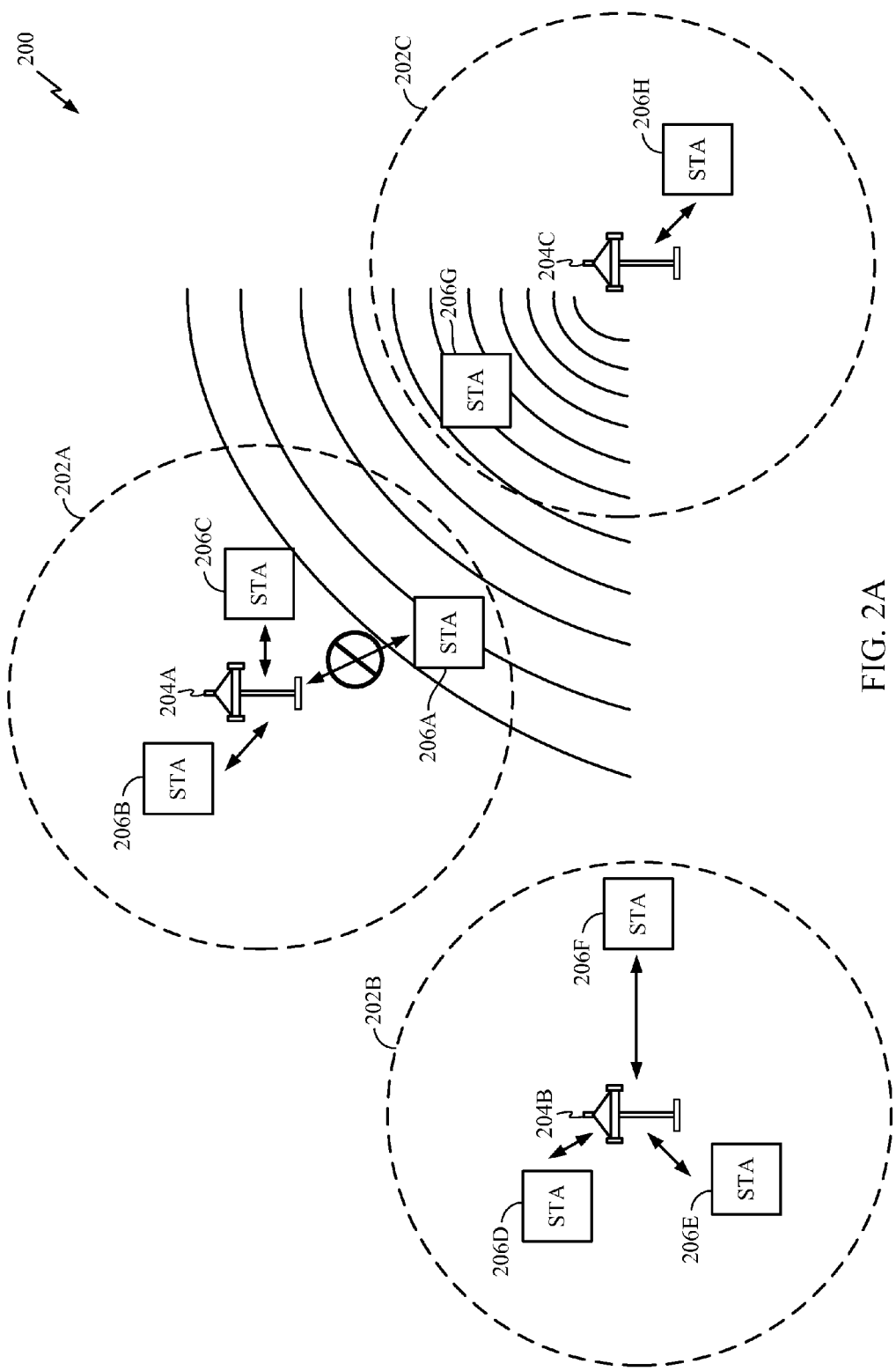
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-7.

Figure 2B:
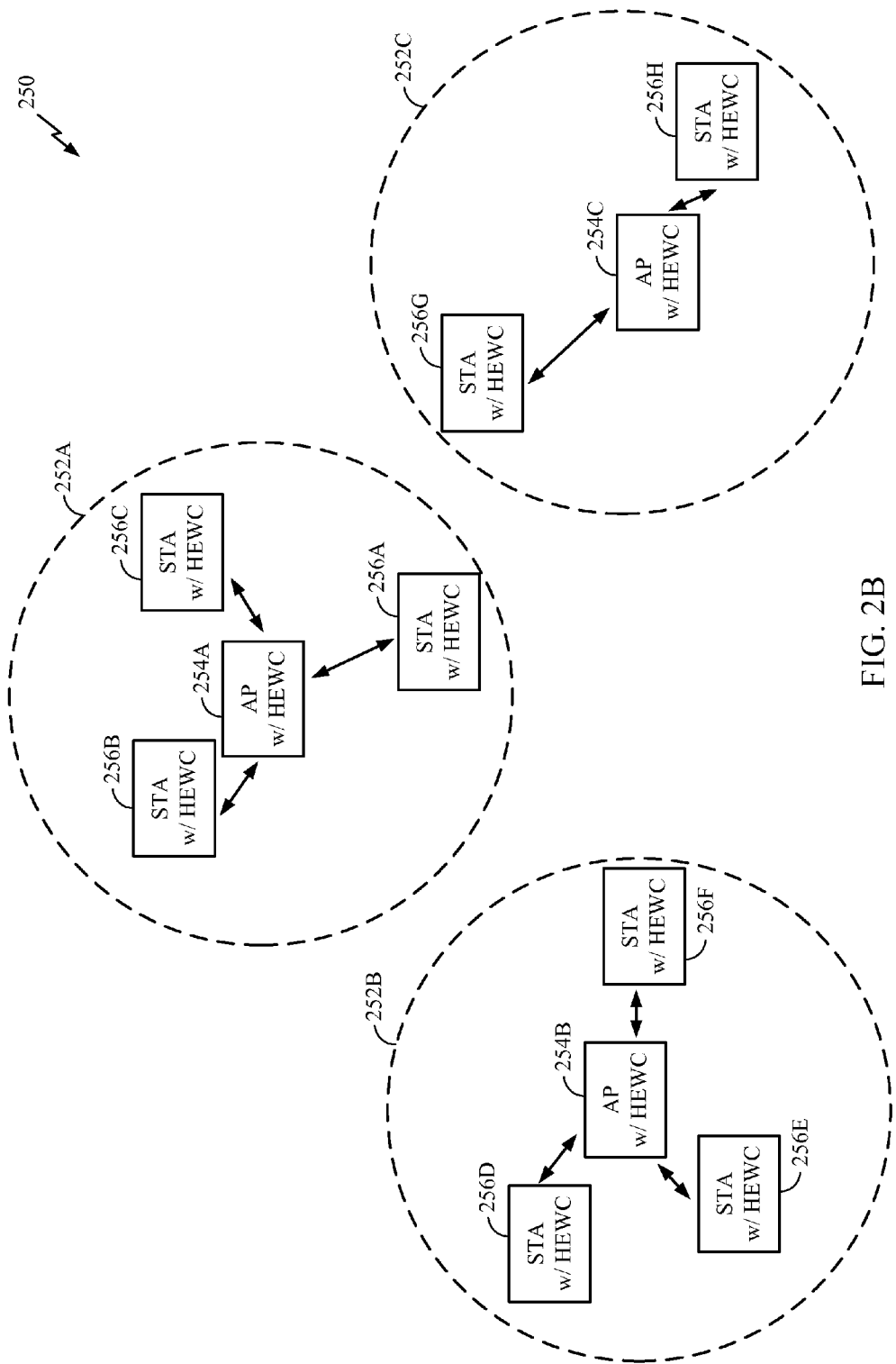
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

In an embodiment, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
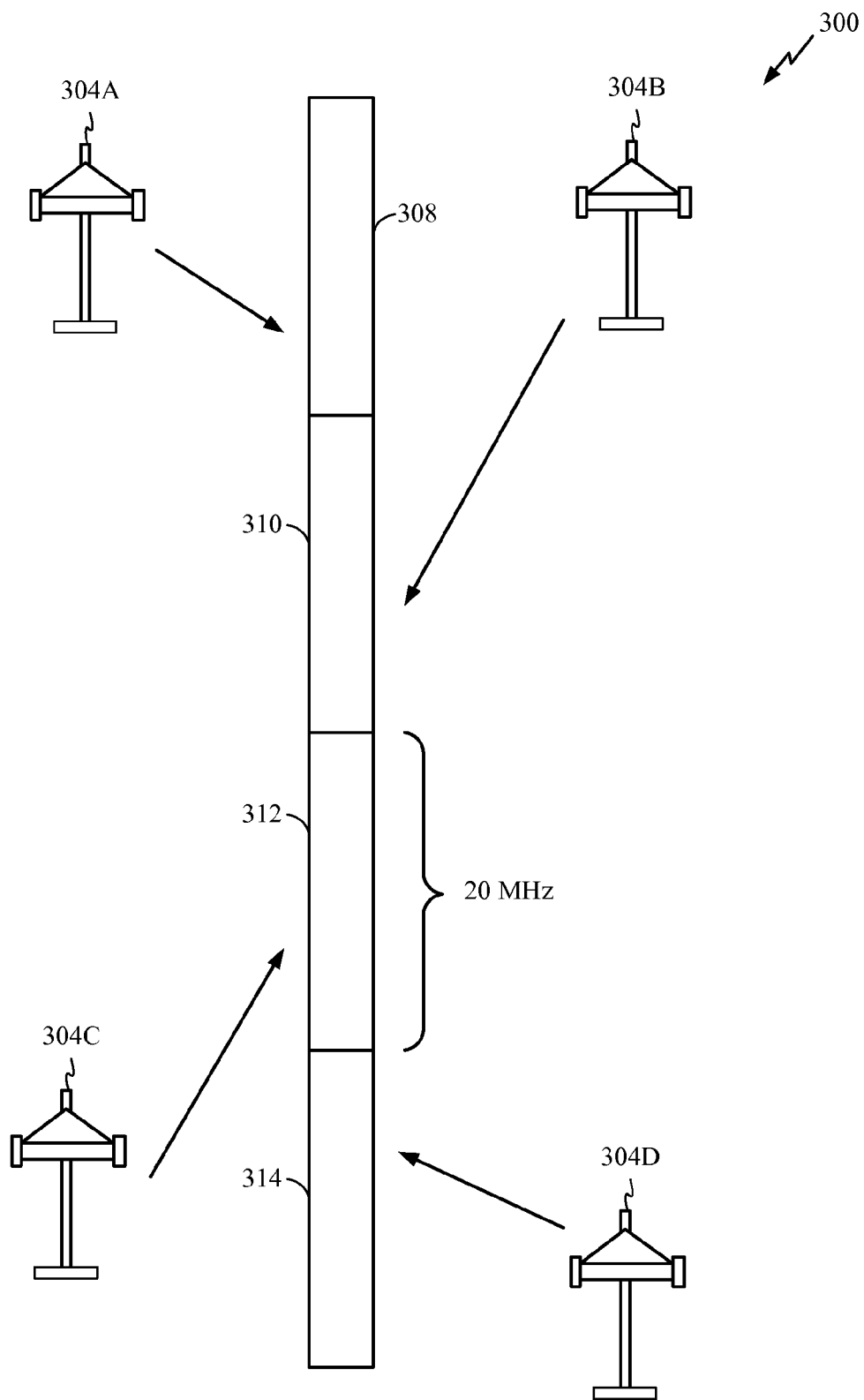
FIG. 3 shows frequency multiplexing techniques that may be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIG. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314 (e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when one or more of the APs 304A-D and the STAs that are in a state or condition such that the STAs can communicate concurrently with other devices (e.g., STAs near the center of the BSA) and are communicating with each other, then each AP 304A-D and each of these STAs may communicate using a portion of or the entire 80 MHz medium. Because the APs and STAs do not interfere with each other, they may effectively share a common portion of available bandwidth.

When one or more of the APs 304A-D and the STAs that are in a state or condition such that the STAs cannot communicate concurrently with other devices (e.g., STAs near the edge of the BSA) and are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 represent different portions of the communication medium, a first transmission using a first segment may not interfere with a second transmission using a second segment.

Thus, APs and/or STAs that include the high-efficiency wireless component, including those devices that are in a state or condition such that they cannot communicate concurrently with other devices, may be able to communicate concurrently with other APs and STAs without interference using the partitioned bandwidth scheme shown in FIG. 3. Accordingly, the throughput of the wireless communication system 300 may be increased when compared to a communications system that includes the same devices but does not partition the wireless medium into multiple bandwidth segments.

In the case of apartment buildings or densely-populated public spaces, APs and/or STAs that use the high-efficiency wireless component may experience reduced latency and increased network throughput even as the number of active wireless devices increases, thereby improving user experience.

Figure 4:
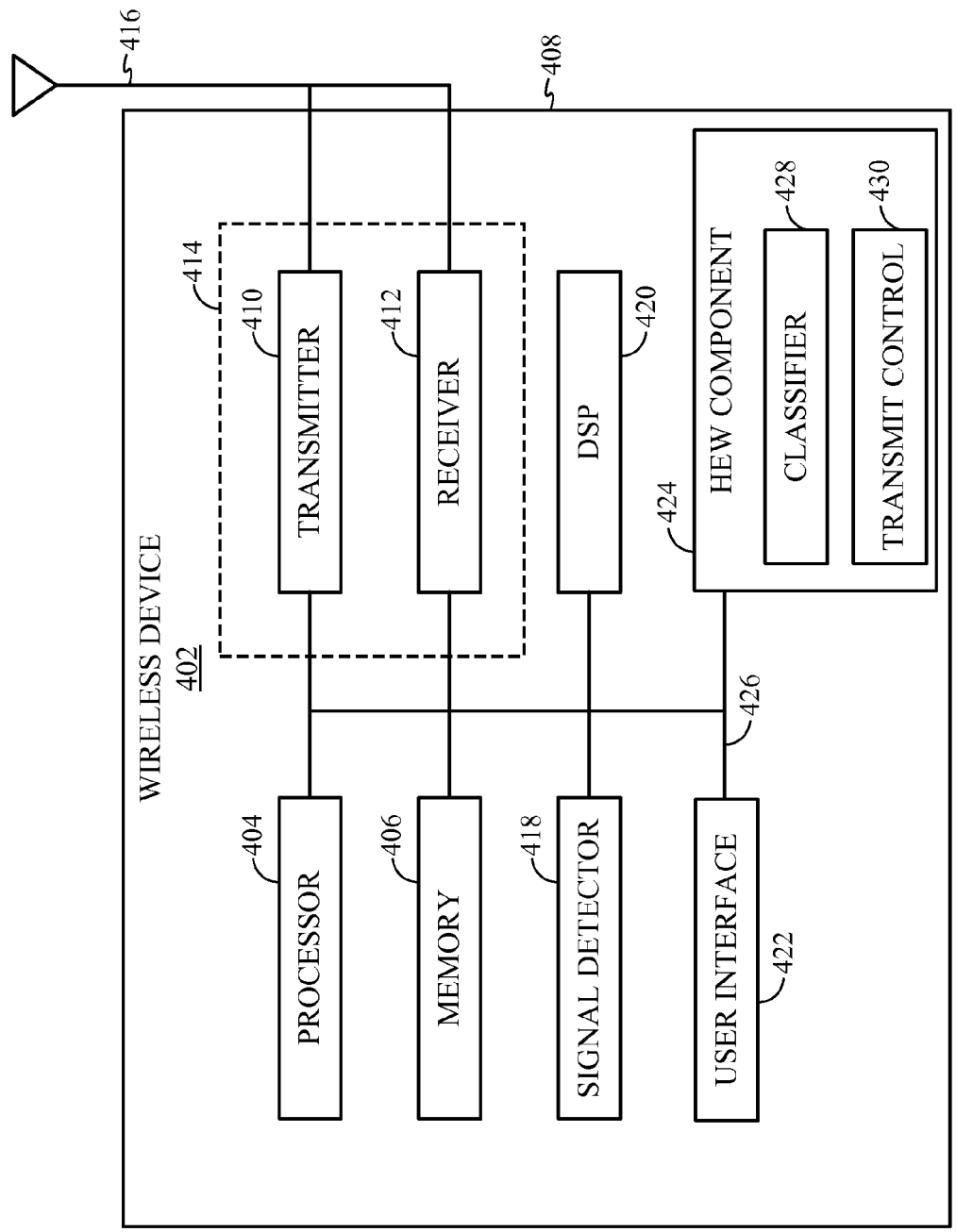
FIG. 4 shows a functional block diagram of an exemplary wireless device that may be employed within the wireless communication systems of FIGS. 1, 2B, and 3.

FIG. 4 shows an exemplary functional block diagram of a wireless device 402 that may be employed within the wireless communication systems 100, 250, and/or 300 of FIGS. 1, 2B, and 3. The wireless device 402 is an example of a device that may be configured to implement the various methods described herein. For example, the wireless device 402 may comprise the AP 104, one of the STAs 106, one of the APs 254a-c, one of the STAs 256a-h, and/or one of the APs 304a-d.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, a STA 256, and/or an AP 304, and may be used to transmit and/or receive communications. That is, either AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

FIG. 5A illustrates an exemplary structure of a physical layer packet which may be used in a high efficiency WiFi implementation. The high efficiency packet 500a may be used, for example, to transmit multiple payloads to different destination devices. For example, a first, second, and third payload may be transmitted to a first, second, and third device respectively.

The high efficiency packet 500a includes a legacy preamble 502a, high efficiency (he) indication 504a, a legacy payload 506a, a high efficiency signal field 508a, an optional long training field and/or short training field 509a, a high efficiency payload field 510a, an optional long training field and/or short training field 511a, a high efficiency signal field 512a, and a high efficiency payload field 514a. In some aspects, the high efficiency indication field 504a may indicate that the packet 500a includes one or more of the he-signal field 508a, the he payload 510a, the he-signal field 512a and the he payload field 514a.

The high efficiency packet 500a may provide for the aggregation of multiple messages destined for different wireless devices into one physical layer wireless packet. For example, the high efficiency packet 500a contains he payload 510a and he payload 514a. The number of high efficiency payload fields in various aspects of high efficiency packet 500a may vary from that illustrated. For example, high efficiency packet 500a may contain only one high efficiency payload in some aspects. In some other aspects, the high efficiency packet 500a may contain 3, 4, 5, 6, 7, 8, 9, or 10 high efficiency payloads for example.

By aggregating multiple messages or payloads, a communications system utilizing packet 500a may provide for reduced overhead and increased throughput in a wireless network when compared to a communications system that sends each of the multiple messages or payloads individually. For example, by transmitting packet 500a, which may include a plurality of messages such as he payload 510c and he payload 514c, at least some of which are addressed to different devices, overhead associated with transmitting the preamble 502a of the packet 500a may be amortized over the multiple messages. Additionally, by transmitting one longer packet instead of multiple smaller packets, such as one for each message included in packet 500a, a transmitting device may need to only contend for the wireless medium once before sending the packet 500a. In contrast, if each message within the packet 500a were transmitted in a separate wireless message, the transmitting device may be required to contend for the media for each separate wireless message. In some circumstances, one or more of those additional transmissions may result in a packet collision. As a result, the transmitting device may be required to perform additional carrier sense medium access collision resolution processes before attempting to retransmit the message. The CDMA process may include a back-off procedure, resulting in additional potential lost bandwidth on the wireless medium. The additional overhead associated with transmission of the multiple messages may be reduced by transmitting the multiple messages within one packet 500a.

FIG. 5B shows a portion 520 of high efficiency packet 500a. Specifically, portion 520 shows one implementation of a portion of legacy preamble 502a and high efficiency indication 504a. Packet portion 520 illustrates that a legacy preamble 502a may include a short training field 522, long training field 524, and legacy signal field 526. In some aspects, the legacy preamble signal field 526 may include a duration indication (not shown). In some aspects of high efficiency packet 500a, the duration indication of the legacy preamble signal field 526 may indicate the duration of the entire high efficiency packet. For example, in the example of high efficiency packet 500a of FIG. 5A, the duration would include all illustrated fields up to and including the he payload 514a. The he indication field 504a follows the legacy preamble signal field 526. In some aspects, the he indication field 504a may include three symbols 505a-c. In some aspects, these symbols may be modulated using Q-BPSK rotation to provide an indication of a high efficiency payload that follows the he indication 504a. In some aspects, one or more features of the he indication field 504a may be included in the he signal fields 508a-c, and/or 512a-c, some of which are described below.

Aspects providing a legacy preamble 502a as part of a high efficiency packet may enable legacy devices to continue to properly defer to packets including the legacy preamble 502a. These legacy devices may rely on use of the legacy signal field to determine when to defer. For example, this may be particularly useful in some wireless networks, such as 802.11ac networks that utilize a mixed mode preamble.

FIG. 5C shows another implementation of a high efficiency packet 500b. In the implementation of packet 500b, the he indication field 504a is not present. In this implementation, high efficiency packet 500b may be distinguished from legacy packets based on one or more fields of the legacy preamble 502b. For example, in one aspect, one or more fields of a legacy signal field, such as legacy signal field 526, discussed with respect to FIG. 5B above, may distinguish a high efficiency packet from a legacy packet. In another aspect, a reserved state or field of a two symbol VHT-SIG-A field may be used to differentiate between a high efficiency packet and a legacy packet. In some aspects, this two symbol VHT-SIG-A field may be included in one or more of the he signal fields 508a-c, and/or 512a/c, some of which are described below.

FIG. 5D shows an exemplary implementation of a high efficiency packet. Similar to FIG. 5A, the high efficiency packet 500c includes a legacy portion of a preamble 502c, a high efficiency indication 504c, a legacy data field 506c, a high efficiency signal field 508c, a high efficiency payload field 510c, a high efficiency signal field 512c, and a high efficiency payload field 514c. The high efficiency payload field 510c may be modulated using multi-user MIMO (MU-MIMO) to one or more receiving devices while the high efficiency payload field 514c may be modulated using OFDMA to one or more receiving devices. Note that the illustration of packet 500c does not show packet 500c including short and/or long training fields, for example, before signal field 508c or signal field 512c. However, despite this illustration, in some aspects of packet 500c, one or more long and/or short training fields are included between at least legacy data 506c and signal field 508c, and/or he payload 510c, and signal field 512c.

FIG. 5D shows the high efficiency payload field 514c modulated using three sub-bands, 515a-c. A first sub-band 515a modulates data for a single device ("Device 1") for the duration of the high efficiency payload field 514c. Similarly, sub-band 515c also modulates data for a single device ("Device 3") for the duration of the high efficiency payload field 514c. Sub-band 515b modulates data for two different devices ("Device 2A" and "Device 2B"). Data for multiple devices may be transmitted within a single sub-band, as shown in FIG. 5D, by overloading a group identifier for two devices. For example, if two devices have the same user position within a group id that is signaled in he signal field 512c (corresponding to payload 514c). For example, as shown in FIG. 5D, device 2A and device 2B may have the same position within a GID signaled by he signal field 512c.

As further described below with respect to FIG. 5E, a sub-band allocation field of the high efficiency signal field 512c may indicate a number of destination devices for data modulated within each of sub-bands 515a-c.

In some aspects, in sub-bands modulating data for multiple devices, the data of the multiple devices may be delineated or separated by one or more symbol signatures 516. The signature(s) 516 may enable a receiving device to identify when data for a particular device begins within a particular sub-channel. In some aspects, a signature delineating or separating the data of two different devices within a sub-band, such as signature 516, may include a signal field, a short training field and/or a long training field. The signal field may indicate one or more of a modulation coding scheme (MCS), Coding, a number of spatial streams (Nss), or Space Time Block Coding (STBC) for data following the signal field in the packet. In some aspects, the signature 516 may include a particular sequence of bit values that have been preassigned to indicate a transition from data destined for a first device or group of devices to data destined for a second device or group of devices.

FIG. 5E shows an exemplary implementation of a high efficiency payload 560 and at least a portion of a preceding signal field 508. The high efficiency signal field portion 508 includes a transmission type indication 552, a payload end indication 554, a frequency sub band allocation field 556, and a last payload indication 558. In some implementations, high efficiency signal fields 508a-c and 512a-c, shown in FIGS. 5A, 5C, and 5D, may conform to the format of high efficiency signal field 508 shown in FIG. 5E or at least include one or more of the fields described with respect to FIG. 5E.

In one aspect, the transmission type indication 552 indicates whether the payload field 560 is modulated using single user MIMO, multi-user MIMO, or orthogonal frequency-division multiple access (OFDMA). For example, in some aspects, the modulation type indication may comprise one bit. In some aspects, if the bit is zero, an Nsts field in the high efficiency signal field 508 (not shown) is interpreted as providing a number of spatial streams for each user within an assigned sub-band. In these aspects, if the bit is set, it may indicate that an Nsts field in the high efficiency header field 508 (again, not shown) is interpreted as providing the number of spatial streams for each device across the entire bandwidth. In some aspects, a transmission type indication field 552 may not be provided in high efficiency signal field 508. In these aspects, a modulation type of payload 560 may be indicated using other unused state information of any field in a high efficiency signal field 508.

In some aspects, the payload end indication field 554 indicates a length or duration of high efficiency payload 560. In another aspect, the duration of a payload may be fixed, and therefore, payload end indication 554 may not be included in high efficiency signal field 508.

The frequency sub-band allocation field 556 may indicate how frequency sub-bands of an OFDMA payload field 560 are allocated for data destined for different devices. For example, in some aspects, the frequency sub-band allocation field 556 may represent the number of subbands used to transmit data for multiple devices. For example, a frequency sub-band allocation field 556 of zero in one aspect may indicate that each frequency sub-band of an OFDMA payload field 560 is used exclusively for data destined for a single device. In some aspects, a frequency sub-band allocation field 556 with a value of one (1) may indicate that payload 560 includes data for at least two users within a first sub-band of the transmitted data. In one aspect, a frequency sub-band allocation field with a value of two (2) may indicate that data 560 is transmitted such that there are at least two users within a first and second sub-band of the transmitted data. In one aspect, a frequency sub-band allocation field with a value of three (3) may indicate that data 560 is transmitted such that there are at least two users within a first, second, and third sub-band of the transmitted data. In one aspect, a frequency sub-band allocation field with a value of four (4) may indicate that data 560 is transmitted such that there are at least two users within a first, second, third and fourth sub-band of the transmitted data.

In some aspects, a frequency sub-band allocation field 556 with a value of seven (7) indicates he payload field 560 is transmitted using SU-MIMO or MU-MIMO. In some aspects, the frequency sub-band allocation field 556 is one, two, or three bits long. In some other aspects, the frequency sub-band allocation field 556 may also include the functions of the transmission type indication field 552, discussed above. In these aspects, the transmission type indication field 552 may not be included in the high efficiency signal field 508.

Figure 6:
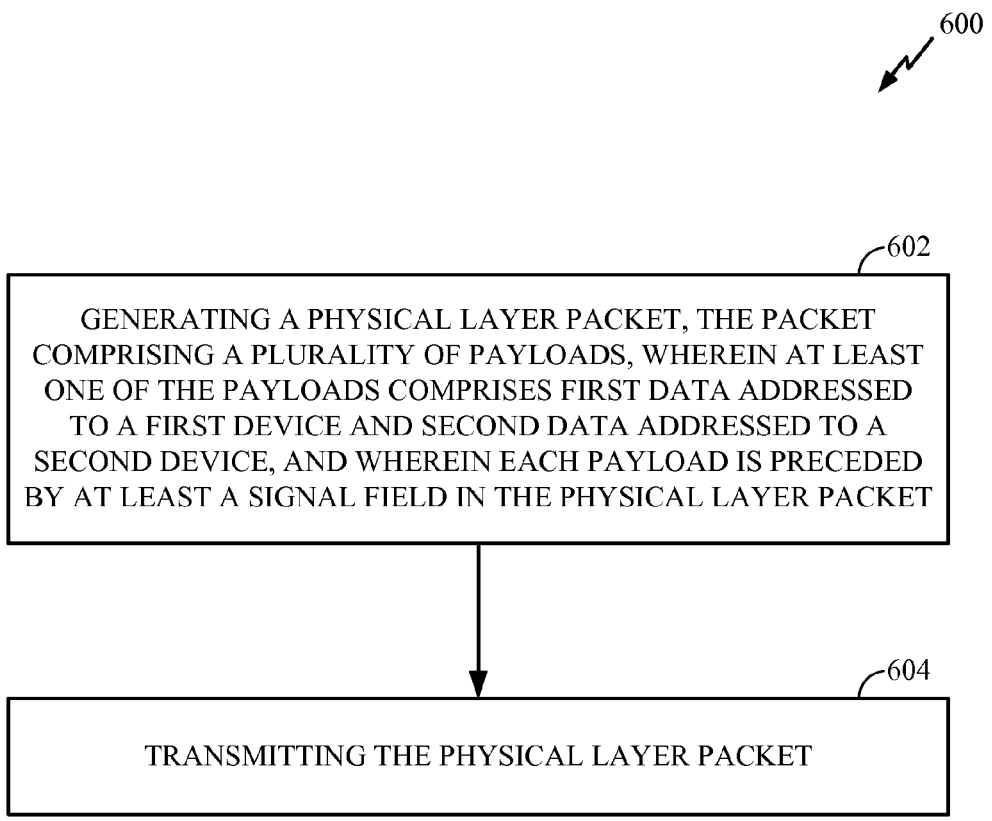
FIG. 6 is a flowchart of a process for transmitting a high efficiency packet on a wireless network.

FIG. 6 is a flowchart of a process for transmitting a high efficiency packet on a wireless network. The packet transmitted by process 600 below may include a plurality of payloads, with at least some of the payloads including data addressed to different devices. Therefore, data destined for multiple different devices may be transmitted using a single packet. This contrasts with current solutions that require the transmission of separate packets for each set of data destined for a unique device (at least when the data is unicast).

With the proposed method below, some of the data in a transmitted packet may be addressed to a first device (but not, in at least some aspects, to a second device) and some of the data in the transmitted packet may be addressed to at least the second device (but not, in at least some aspects, to the first device). For example, if an access point has data queued for three different stations, using the proposed method below, the access point may be able to transmit a single packet that includes separate data for each of the three different stations.

When compared to solutions that transmit three separate packets, with each packet including data addressed to a particular device, the method 600 discussed below may provide for reduced communications network overhead. For example, network overhead associated with packet header information for the packet transmitted below may be amortized over the larger amount of data transmitted for both the first and second, (and potentially third) devices. This compares favorably to a solution that would require two or three separate packet headers to be transmitted, one for each packet transmitted to each of the first, second, and third devices.

In some aspects, process 600 may be performed by an access point or a station. In some aspects, process 600 may be performed by the wireless device 402. For example, one or more of processor 404, transmitter 410, and receiver 412 of device 402 may be configured by instructions stored in the memory 406 to perform the blocks of process 600 described below.

In block 602, a physical layer packet is generated. Block 602 may be performed, in some aspects, by the processor 404. The physical layer packet is generated to include a plurality of payloads. Each of the plurality of payloads may include data and addressing information for the data. The addressing information indicates one or more destination devices for the data. In some aspects, a payload as discussed with reference to FIG. 6 may be equivalent to a PLCP protocol data unit (PPDU). In some of these aspects, a payload may be equivalent to a multi-STA PPDU.

At least one of the payloads includes first and second data. The at least one payload also includes addressing information indicating that the first and second data are addressed to different destination devices.

In some aspects, the packet is generated such that the plurality of payloads are separated in the physical packet by one or more of a short training field, a long training field, and/or a signal field.

In some aspects, each payload is preceded in the physical layer packet by a signal field. In some of these aspects, the signal field for each payload indicates a number of frequency sub-bands within the payload that include data transmitted to at least two different devices. For example, the signal field(s) may substantially conform with the signal field format 508 shown in FIG. 5E. In some aspects, the packet may be generated to include frequency sub-band allocation field(s) 556 in one or more signal fields included in the packet.

In some aspects, a signal field for a payload includes a transmission mode indication for the payload. For example, as discussed above, the mode indication may indicate whether the data in the payload is transmitted using MU-MIMO, single user transmission, or OFDMA transmission. In some aspects, the signal field for a payload may indicate the duration for the payload. For example, it may indicate the total time required to transmit all the data included in the payload.

In some other aspects, the signal field may indicate a transmission schedule for the payload. For example, the transmission schedule may indicate which devices will receive data during which portion of the payload. The transmission schedule may enable devices receiving the payload to selectively ignore portions of the packet not destined for them. This may reduce processing overhead associated with reception of the packet in some aspects.

In some aspects, the signal field may indicate whether its corresponding payload included in the packet immediately following the signal field is the last payload in the packet. For example, signal fields included in the packet may substantially conform in some aspects to the format of signal field 508, shown in FIG. 5E.

In some aspects, the physical layer packet is generated to include a high efficiency indication. In some aspects, the high efficiency indication indicates whether high efficiency payloads, such as he payload 510c and/or he payload 514c of FIG. 5D, are present in the packet. In some aspects, the high efficiency indication indicates whether the packet includes at least first data and second data, where first and second data are addressed to different destination devices. In some aspects, the high efficiency indication is included in the legacy preamble. For example, a legacy signal field included in the legacy preamble may comprise a high efficiency indication. In some aspects, the legacy signal field 526 shown in FIG. 5B may provide a high efficiency indication.

In some other aspects, the high efficiency indication is included in a first high efficiency signal field. In some aspects, the first high efficiency signal field may be of a different format than any high efficiency signal fields that follow in the packet. For example, in some aspects, the first high efficiency signal field may comprise three symbols, while subsequent high efficiency signal fields contain greater than three symbols. In some aspects, the high efficiency signal field is modulated using Q-BPSK rotation.

In some other aspects, the first high efficiency signal field is of a similar format to subsequent high efficiency signal fields. For example, in some aspects, the first high efficiency signal field may be substantially in conformance with the high efficiency signal fields 508a, 508b, and 508c shown in FIGS. 5A, 5C, and 5D respectively.

In some aspects, first data and second data may both be transmitted using MU-MIMO. Alternatively, first and second data may be transmitted using OFDMA. First data and second data may be separated in the packet by a signature field, such as signature field 516, discussed above with respect to FIG. 5D. In some aspects, the packet may be further generated to include a second payload including third and fourth data. Third and fourth data may be transmitted using either the same or a different modulation scheme than first and second data. For example, if first data and second data are transmitted using MU-MIMO, third and fourth data may be transmitted using either MU-MIMO, or OFDMA for example. In some aspects, third and fourth data are addressed to different devices. In some aspects, third and fourth data are separated within the packet by a signature, such as signature field 516. The signature may include one or more of a short training field, a long training field, and/or a special sequence of bits indicating the signature. In some aspects, the first and second devices may have the same group identifier.

In some aspects, a duration of transmission of first and second data may be fixed or variable. If the duration is fixed, a duration field may not be associated with the payload carrying first and second data in the generated packet. Similarly, the duration of third and fourth data may also be fixed or variable.

In some aspects, the packet is generated such that data within a payload is ordered based on an MCS of a destination of either third data and/or fourth data. For example, in some aspects, data for a destination with a lower MCS is included in the packet before data for a destination with a higher MCS value.

In some aspects, the packet is generated to include a payload that includes data transmitted only to a single device.

In some aspects, the packet is generated to include a legacy preamble and a legacy payload. For example, legacy preamble 502a may be included in the packet in some aspects. The legacy payload may comprise a legacy data portion. The legacy payload may be formatted as legacy data field 506a in some aspects.

In another aspect, the legacy preamble comprises a VHT-SIG-A field, and the VHT-SIG-A field comprises the high efficiency indication. In some aspects, the high efficiency indication may be signaled by a reserved state of a two symbol VHT-SIG-A field.

In block 604, the physical layer packet is transmitted. In some aspects, the physical layer packet comprises a legacy preamble and/or the legacy data portion, and/or the high efficiency indication, and/or a signal field, all of which are discussed above. In some aspects, the transmitted physical layer packet may incorporate one or more of the aspects discussed above with respect to FIGS. 5A-5E. In some aspects, block 604 may be performed by the transmitter 410 or the processor 404.

Figure 7:
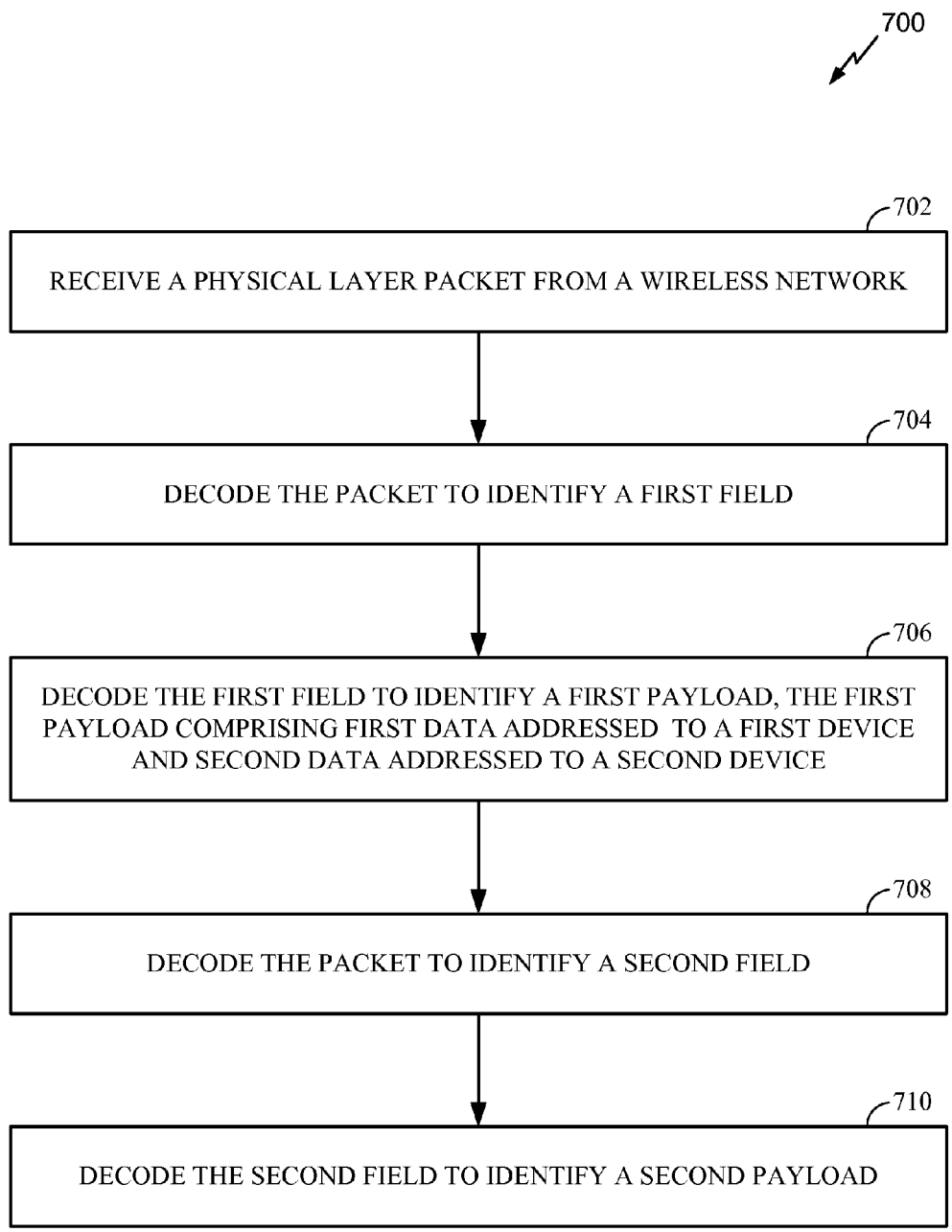
FIG. 7 is a flowchart of a process for receiving a high efficiency packet on a wireless network.

FIG. 7 is a flowchart of a process for receiving a high efficiency packet on a wireless network. The received high efficiency packet may include a plurality of payloads, with at least some of the payloads including data addressed to different devices. Therefore, part of receiving the high efficiency packet may include scanning the packet to identify data that is addressed to the receiving device, while selectively discarding data not addressed to the receiving device. This contrasts with current solutions that typically address the entirety of a packet to a particular device (or devices in the case of multicast/broadcast). With these current solutions, an entire packet may be either discarded or received.

For example, with the proposed method below, some of the data may be addressed to a first device (but not, in at least some aspects, to a second device) and some of the data may be addressed to at least the second device (but not, in at least some aspects, to the first device). The apparatus performing method 700 below may be either a first device, second device, or third device. Therefore, the method below may selectively discard data not addressed to it, while, as discussed above, receiving and more completely processing that portion of the packet that is addressed to it.

When compared to solutions that utilize two separate packets to transmit the same data, with each packet including data addressed to a particular device, the method 700 discussed below may provide for reduced communications network overhead for example. For example, network overhead associated with packet header information for the packet discussed below may be amortized over the larger amount of data transmitted for both the first and second devices. This compares favorably to a solution that would require two separate packet headers to be transmitted, one for each packet transmitted to each of the first and second devices.

In some aspects, process 700 may be performed by an access point or a station. In some aspects, process 700 may be performed by the device 402 of FIG. 4.

In block 702, a physical layer packet is received from a wireless network. In some aspects, block 702 may be performed by the receiver 412 and/or the processor 404.

In block 704, the packet is decoded to identify a first field. In some aspects, the first field may be a high efficiency section of a legacy preamble. In some aspects, the first field may be a signal field.

In block 706, the first field is decoded to identify a first payload. The first payload includes first data addressed to at least a first device and second data addressed to at least a second device. The first device is different than the second device.

In some aspects, first data and second data may be separated in the first payload by a signature. The signature may include a short and/or long training field, a signal field, and/or a predetermined sequence of bit values. In some aspects, the payload is scanned for the signature. In some aspects, the start of the signature may only occur before every Nth OFDM symbol. This may reduce overhead associated with scanning for the signature.

Upon identification of the signature, first data and second data can be identified. For example, first data may precede the signature and second data may come after the signature in the packet. The signature may be similar to signature 516 discussed above in some aspects. In some aspects, one or more of blocks 704 and 706 may be performed in some aspects by the processor 404.

The first field may include a transmission mode indication, indicating whether first data and/or second data are transmitted using a single user transmission mode, MU-MIMO, or OFDMA. In some aspects, the first field is a high efficiency signal field, such as he signal fields 508a and 512a of FIG. 5A, or fields 508b or 512b of FIG. 5C, or fields 508c or 512c of FIG. 5D. In some aspects, a payload as discussed with reference to FIG. 7 may be equivalent to a physical layer convergence protocol (PLCP) protocol data unit (PPDU). In some of these aspects, a payload may be equivalent to a multi-STA PPDU.

In block 708, the packet is decoded to identify a second field. The second field may be a signal field. The second field may be preceded by a second signature. The second signature may include one or more of a short or long training field, or a predetermined sequence of bit values. The second field may be identified by scanning the packet for the second signature. In some aspects, the start of the second signature may only occur before every Nth OFDM symbol. This may reduce overhead associated with scanning for the second signature. Note that if the first field, discussed above, is a signal field, it may also be preceded by a signature, similar to the second signature.

The second field is decoded to identify a second payload in block 710. The packet may include a plurality of payloads that includes the first and second payloads, but may also include additional payloads. Each of the payloads may include data and addressing information for the data. In some aspects, one or more of blocks 708 and 710 may be performed in some aspects by the processor 404.

In some aspects, at least two of the plurality of payloads in the packet received in process 700 may be received using different transmission modes. For example, a first payload may be received using SU-MIMO while a second payload may be received using OFDMA. Another payload of the plurality of payloads may be received via single user transmission. In some aspects, the received packet may be in a format as described by one or more of FIGS. 5A-E.

If a payload is received via OFDMA, a sub-band of the OFDMA transmission of the payload may include data destined for at least two different devices. For example, the sub-band may include third data, destined for a third device, and fourth data, destined for a fourth device.

The payloads are processed based on signal fields preceding the payloads in the packet. In some aspects, process 700 may determine an end of the physical layer packet based on a last payload indication in a signal field. For example, the last payload indication field 558 may be utilized to determine an end of the physical layer packet in some aspects. Some aspects of process 700 include determining reception of the packet received in block 702 is complete when a last high efficiency payload indication (as may be indicated in field 558) is received, and reception of the payload corresponding to the indication has also been completed.

In some aspects, the received packet is decoded to identify a transmission schedule for one or more of the payloads. In some aspects, the transmission schedule may be included in a signal field or a duration field preceding the scheduled payloads.

In some aspects, receipt of each of the payloads included in the received physical packet may be based on a determined end to each of the payloads. The end of each payload may be determined, in some aspects, based on a payload end indication field, such as payload end indication field 554 shown in FIG. 5E. In some other aspects, the end of each payload may be determined based on a fixed payload duration.

A payload of the plurality of payloads may be decoded based on the transmission mode indicated in a preceding signal field. In some aspects, one or more payloads may be received using OFDMA. In some aspects, a frequency sub-band of one or more of the OFDMA payloads may include data for at least two devices, for example, as shown in high efficiency payload 514c of FIG. 5D. In these aspects, block 704 may decode the data in the sub-band based on a group identifier of a device performing process 700.

If the received packet includes OFDMA payloads, a frequency sub-band allocation field may be decoded from signal fields preceding the OFDMA payloads. The frequency sub-band allocation field in the received packet may function as described above with reference to FIG. 5E and frequency sub-band allocation field 556. A receiving device may determine how to decode data within OFDMA sub-bands of received payloads based on the frequency sub-band allocation field.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of transmitting a physical layer packet to a plurality of wireless devices comprising:
generating a physical layer packet to include a first signal field, a first payload following the first signal field, a first channel estimation training field following the first payload, a second signal field following the first channel estimation training field, and a second payload following the second signal field, wherein at least one of the payloads comprises first data addressed to a first device and second data addressed to a second device; and
transmitting the physical layer packet.

2. The method of claim 1, wherein the physical layer packet is generated to include a second channel estimation training field between the first channel estimation training field and the second signal field.

3. The method of claim 1, further comprising indicating a transmission schedule within the first signal field, the transmission schedule indicating a first portion of the first payload including the first data and a second portion of the first payload including the second data.

4. The method of claim 3, further comprising indicating the transmission schedule in a duration field of the first signal field.

5. The method of claim 1, further comprising determining whether a transmission mode of the first payload is single user transmission, multi-user multiple input multiple output transmission (MU-MIMO) transmission or orthogonal frequency-division multiple access (OFDMA) transmission; and generating the first signal field to indicate the determined transmission mode.

6. The method of claim 5, further comprising:
generating the first payload to include a first sub band comprising the first data;
generating the first payload to include a second sub band comprising third data and fourth data, wherein third data and fourth data are addressed to different devices; and
transmitting the first payload using at least the first and second sub-bands via OFDMA.

7. The method of claim 6, further comprising separating the transmission of third data and fourth data in time within the second sub-band by a signature.

8. The method of claim 6, further comprising ordering the transmission of third data and fourth data based on a modulation and coding scheme (MCS) of a destination device for third data and a modulation and coding scheme (MCS) for a destination device of fourth data.

9. An apparatus for transmitting a physical layer packet to a plurality of wireless devices, comprising:
a processor configured to generate a physical layer packet, the packet comprising a first signal field, a first payload following the first signal field, a first channel estimation training field following the first payload, a second signal field following the first channel estimation training field, and a second payload following the second signal field, wherein at least one of the payloads comprises first data addressed to a first device and second data addressed to a second device; and
a transmitter, configured to transmit the physical layer packet.

10. The apparatus of claim 9, the processor further configured to generate the physical layer packet to include a second channel estimation training field between the first channel estimation training field and the second signal field.

11. The apparatus of claim 9, the processor further configured to generate the physical layer packet to indicate a transmission schedule within the first signal field, the transmission schedule indicating a first portion of the first payload including the first data and a second portion of the first payload including the second data.

12. The apparatus of claim 11, the processor further configured to indicate the transmission schedule in a duration field of a signal field preceding the plurality of payloads.

13. The apparatus of claim 9, the processor further configured to
determine whether a transmission mode of the first payload is single user transmission, multi-user multiple input multiple output transmission (MU-MIMO) transmission or orthogonal frequency-division multiple access (OFDMA) transmission, and
generate the physical layer packet to include a signal field preceding a first payload of the plurality of payloads to indicate the first payload is transmitted using the determined mode.

14. The apparatus of claim 13,
wherein the processor is further configured to:
generate the first payload to include a first sub band comprising the first data,
generate the first payload to include a second sub band comprising third data, and fourth data, wherein third data and fourth data are addressed to different devices; and
the transmitter is further configured to transmit the first payload using at least the first and second sub-bands via OFDMA.

15. The apparatus of claim 14, wherein the processor is further configured to order the transmission of third data and fourth data based on a modulation and coding scheme (MCS) of a destination device of third data and a modulation and coding scheme (MCS) of a destination device of fourth data.

16. A method for receiving a high efficiency physical data packet from a wireless network, the method comprising:
receiving a physical layer packet from a wireless network;
decoding the physical layer packet to identify a first signal field;
decoding the first signal field to identify a first payload from the physical layer packet, the first payload comprising first data addressed to a first device and second data addressed to a second device;
decoding the physical layer packet to identify a second signal field following the first payload; and
decoding the physical layer second signal field to identify a second payload, the second payload comprising third data addressed to at least one of the first device, the second device, or a third device.

17. The method of claim 16, further comprising:
decoding the physical layer packet to identify a signature that separates the first and second payloads in the physical layer packet, the signature including one or more of a short channel estimation training field, a long channel estimation training field, and a signal field; and
decoding the second payload based on the identified signature.

18. The method of claim 16, further comprising decoding the first signal field to determine a transmission schedule within the first signal field indicating a first portion of the first payload including the first data and a second portion of the first payload including second data.

19. The method of claim 18, further comprising decoding a duration field in the first signal field to determine the transmission schedule for a payload.

20. The method of claim 16, further comprising decoding a signal field preceding a payload to determine whether the payload is received via single user transmission, multi-user multiple input multiple output transmission (MU-MIMO) transmission or orthogonal frequency-division multiple access (OFDMA) transmission.

21. The method of claim 16, further comprising receiving the first payload via OFDMA, and decoding a sub-band of the OFDMA payload to determine third data and fourth data are addressed to different devices.

22. The method of claim 21, further comprising decoding data in the sub-band based on a group identifier.

23. The method of claim 21, further comprising decoding a signal field preceding the payload to determine an indication of a number of frequency sub-bands in the payload that comprise data transmitted to the at least two different devices.

24. An apparatus for receiving a high efficiency physical data packet from a wireless network, the apparatus comprising:
    a receiver configured to receive a physical layer packet from a wireless network,
    a processor configured to:
        decode the physical layer packet to identify a first signal field,
        decode the first signal field to identify a first payload from the physical layer packet, the first payload comprising first data addressed to a first device and second data addressed to a second device,
        decode the physical layer packet to identify a second signal field following the first payload, and
        decode the second signal field to identify a second payload, the second payload comprising third data addressed to at least one of the first device, the second device, or a third device.

25. The apparatus of claim 24, wherein the processor is further configured to:
    decode the packet to identify a signature that separates the first and second payloads in the physical layer packet, the signature including one or more of a short channel estimation training field, a long channel estimation training field, a signal field; and
    decode the second payload based on the identified signature.

26. The apparatus of claim 24, wherein the processor is further configured to decode the first signal field to determine a transmission schedule within the first signal field indicating a first portion of the first payload including the first data and a second portion of the first payload including second data.

27. The apparatus of claim 26, wherein the processor is further configured to decode a duration field in the first signal field to determine the transmission schedule for a payload.

28. The apparatus of claim 24, wherein the processor is further configured to decode a signal field preceding a payload to determine whether the payload is received via single user transmission, multi-user multiple input multiple output transmission (MU-MIMO) transmission or orthogonal frequency-division multiple access (OFDMA) transmission.

29. The apparatus of claim 24, wherein the processor is further configured to receive the first payload via OFDMA, and to identify a portion of data in an OFDMA sub-band of the first payload that is addressed to the apparatus.

30. The apparatus of claim 29, wherein the processor further is further configured to decode data in the sub-band based on a group identifier.

* * * * *